(12) United States Patent
Vasiljevic et al.

(10) Patent No.: US 11,960,885 B2
(45) Date of Patent: Apr. 16, 2024

(54) SEAMLESS PLACE AND ROUTE FOR HETEROGENOUS NETWORK OF PROCESSOR CORES

(71) Applicant: Tenstorrent Inc., Toronto (CA)

(72) Inventors: Jasmina Vasiljevic, Toronto (CA); Ljubisa Bajic, Toronto (CA); Davor Capalija, Toronto (CA); Stanislav Sokorac, Austin, TX (US)

(73) Assignee: Tenstorrent Inc., Toronto (CA)

( * ) Notice: Subject to any disclaimer, the term of this patent is extended or adjusted under 35 U.S.C. 154(b) by 154 days.

(21) Appl. No.: 17/717,769

(22) Filed: Apr. 11, 2022

(65) Prior Publication Data

US 2023/0325183 A1    Oct. 12, 2023

(51) Int. Cl.
  *G06F 9/30*  (2018.01)
  *G06F 9/38*  (2018.01)
(52) U.S. Cl.
  CPC .......... *G06F 9/3001* (2013.01); *G06F 9/3836* (2013.01); *G06F 9/3877* (2013.01)
(58) Field of Classification Search
  CPC .... G06F 9/3001; G06F 9/3836; G06F 9/3877; G06F 8/451; G06F 8/453; G06F 9/30076; G06F 15/00; G06F 9/3889
  See application file for complete search history.

(56) References Cited

U.S. PATENT DOCUMENTS

| | | | | |
|---|---|---|---|---|
| 2016/0315847 A1* | 10/2016 | Zhang | ..................... | H04L 45/56 |
| 2019/0303153 A1* | 10/2019 | Halpern | ................ | G06F 15/825 |
| 2020/0042856 A1* | 2/2020 | Datta | ..................... | G06N 3/045 |
| 2020/0159586 A1* | 5/2020 | Chandramoorthy | .. | G06F 9/4806 |
| 2020/0401402 A1* | 12/2020 | Capalija | .............. | G06F 15/7825 |
| 2022/0229880 A1* | 7/2022 | Thouppuarachchi | ........................ | |
| | | | | G06F 9/3001 |

OTHER PUBLICATIONS

D. Ignjatovic and D. Capalija, "Scale-Out First Microarchitecture for Efficient AI Training", Linley Spring Processor Conference, Apr. 19-23, 2021, 27 pages.
D. Patel, "Tenstorrent Wormhole Analysis—A Scale Out Architecture for Machine Learning that Could Put Nvidia on Their Back Foot", Jun. 25, 2021, SemiAnalysis, retrieved from https://semianalysis.com/tenstorrent-wormhole-analysis-a-scale-out-architecture-for-machine-learning-that-could-put-nvidia-on-their-back-foot/ on Mar. 16, 2022, 22 pages.

* cited by examiner

*Primary Examiner* — Farley Abad
(74) *Attorney, Agent, or Firm* — Daylight Law, P.C.

(57) ABSTRACT

Methods and systems related to parallel computing using heterogeneous networks of computational nodes are disclosed herein. A method for executing a complex computation on a heterogeneous set of computational nodes linked together by a set of links in a network is disclosed. The method includes compiling, using a table of bandwidth values for the set of links in the network, a set of instructions for routing data for the execution of the complex computation. The method also includes configuring a set of programmable controllers on the heterogeneous set of computational nodes with the set of instructions. The method also includes executing the set of instructions using the set of programmable controllers. The method also includes routing data through the network to facilitate the execution of the complex computation by the heterogeneous set of computational nodes and in response to the execution of the instructions.

17 Claims, 5 Drawing Sheets

200

SEAMLESS PLACE AND ROUTE FOR HETEROGENOUS NETWORK OF PROCESSOR CORES

BACKGROUND

Processing cores can cooperatively execute complex computations by executing component computations of that complex computations in distributed fashion across the processing cores. To do so, the processing cores need to share data required for the execution of those component computations as well as receive instructions regarding which component computations they have been assigned. The technology associated with how the complex computation is broken down into component computations and assigned to the various processing cores is associated with the field of parallel computing.

Processing cores can be connected via a network to facilitate the exchanges of data associated with parallel computing. Each processing core can be connected to the network via a dedicated router. When the processing cores are located on a single chip, the network can be referred to as a network-on-chip (NOC). Data can be transmitted amongst the cores using unicast, multicast, or broadcast transmissions. The transmissions can be single-hop or multi-hop depending upon how the cores are connected and the physical location of the source and destination cores within the network. For example, adjacent cores may be able to communicate using a single-hop transmission while distal cores might need to communicate via multi-hop transmissions as data is passed in series between adjacent routers and forwarded from each intermediate router on to the final destination router.

FIG. 1 illustrates a portion of a NOC 100 in which four processing cores 101, 102, 103, and 104 are linked by a network. The network includes a set of buses and a set of routers that facilitate communication among the processing cores. There is a dedicated router associated with each processing core, such as routers 110, 111, 112, and 113. The routers 110, 111, 112, and 113 communicate with their associated processing core 101, 102, 103, and 104 using a network interface unit (NIU). The set of buses include wires connecting the routers to each other and the routers to their NIUs. The NIU is instantiated in hardware on the processing core. The processing cores execute the component computations they have been assigned using a memory and a processing pipeline. The inputs and outputs of the component computations are routed using the routers under the control of the NIUs. The NIUs are low-level components and can execute data transmissions using corresponding low-level memory copy primitives in which a local segment of memory on a processing core is copied to a remote segment of memory on another processing core. In the basic case of a single-hop unicast data transmission, the memory copy operation involves copying a buffer of a limited fixed size from memory on a source core and writing it to a buffer in a memory on the destination core via the buses. To transmit larger amounts of data, the system can issue multiple memory copy operations. A central processing unit (CPU) in the processing cores is involved in both the computation operations and the data flow management.

A rapidly developing computational application to which networks of processing cores have been applied is the field of artificial neural networks (ANNs). Modern ANNs are trained using a massive amount of computational power which is proportional to the number of parameters in the ANN. The current trend in the field of ANNs is one of ever-increasing parameters per ANN. As of the date of this application, researchers have begun to train and deploy ANNs that are scaled to the order of over a trillion parameters. This trend creates a distinct challenge and opportunity for innovation.

There are various approaches being applied in the field of ANNs for dealing with large parameter ANN training. Certain approaches are centered on creating larger individual chips with an increasing number of processing cores to support the training of larger and larger ANNs. However, the physical size of a single chip cannot alone scale at the rate at which ANNs are increasing. Alternative approaches involve the creation of larger networks of chips to address the rapid increase in the size of ANNs. However, these approaches have likewise run into problems in that the larger networks tend to involve network hierarchies including chip-to-chip, server-to-server, and rack-to-rack hierarchical levels. Programming a given ANN to operate on these larger networks generally requires a different programming model for each level. The result is that a programmer is often forced to develop their ANN with a specific network in mind, or to adjust the code for implementing a completed ANN on a network by hand. The different programming models also make it difficult for compilers to compile an ANN for operating on a given network.

SUMMARY

Methods and systems related to parallel computing using heterogeneous networks of computational nodes are disclosed herein. Specific approaches disclosed herein allow for the automated place and route of a complex computation on a heterogeneous network of computational nodes. As used herein, a heterogeneous network of computational nodes refers to a network of computational nodes with at least one of nonuniform links between computational nodes and nonuniform computational nodes. As such, a heterogeneous network of computational nodes can comprise a homogeneous set of computational nodes that are linked together by a network with nonuniform links.

Specific approaches disclosed herein allow a programmer to specify a complex computation for execution on a network of computational nodes without concern for the underlying hardware configuration of the network. Accordingly, the programmer can instantiate additional computational nodes for the execution of portions of the complex computation in the source code representation of the complex computation, and the compiler will assign those computational nodes seamlessly to computational nodes in the heterogeneous network. The programmer can effectively consider the network to be an infinite mesh of computational nodes and the compiler can engage in an automated place and route of the component computations and associated data involved in the execution of the complex computation amongst the computational nodes in the network to most efficiently execute the complex computation. These benefits are achieved through various means as disclosed herein.

A compiler and compilation process are disclosed herein which takes as its input a source code description of a complex computation for execution and a simple machine model of a heterogeneous set of computational nodes linked together by a set of links in a network. The simple machine model can include a table of the bandwidths of the various links in the set of links in the network. The simple machine model can additionally include a table of the latencies of the various links in the set of links in the network.

Additionally disclosed herein is a network of computational nodes in the form of processing cores in a set of multicore processor chips where each multicore processor is a native ethernet device capable of packaging packets for the execution of a directed graph by the network of computational nodes such that data can be routed through the network between multicore processor chips without the need for external ethernet switches. In specific embodiments disclosed herein, the processing cores in the multicore processors are designed to communicate across their NOCs using packets of directed graph data such that the conversion of the NOC packets into Ethernet packets is nearly seamless and does not introduce significant latency to the flow of data through the network as local data is translated into data in ethernet compatible packets.

In specific embodiments of the invention, a method for executing a complex computation on a heterogeneous set of computational nodes linked together by a set of links in a network is disclosed. The method comprises compiling, using a table of bandwidth values for the set of links in the network, a set of instructions for routing data for the execution of the complex computation. The method also comprises configuring a set of programmable controllers on the heterogeneous set of computational nodes with the set of instructions. The method also comprises executing the set of instructions using the set of programmable controllers. The method also comprises routing data: (i) through the network; (ii) to facilitate the execution of the complex computation by the heterogeneous set of computational nodes; and (iii) in response to the execution of the instructions.

In specific embodiments of the invention, a method for executing a complex computation on a heterogeneous set of computational nodes linked together by a set of links in a network is disclosed. The method comprises compiling, using a machine model of the set of links, a set of instructions for routing data for the execution of the complex computation, wherein the machine model includes a bandwidth for each link in the set of links in the network. The method also comprises configuring a set of programmable controllers on the heterogeneous set of computational nodes with the set of instructions. The method also comprises executing the set of instructions using the set of programmable controllers. The method also comprises routing data: (i) through the network; (ii) to facilitate the execution of the complex computation by the heterogeneous set of computational nodes; and (iii) in response to the execution of the instructions.

In specific embodiments of the invention, a system for executing a complex computation is disclosed. The system comprises a heterogeneous set of computational nodes and a set of links in a network. The set of links link the computational nodes in the heterogeneous set of computational nodes. The system also comprises a compiler configured to compile, using a table of bandwidth values for the set of links in the network, a set of instructions for routing data for the execution of the complex computation. The system also comprises a set of programmable controllers on the heterogeneous set of computational nodes configured with the set of instructions. Executing the set of instructions using the set of programmable controllers routes data through the network to facilitate the execution of the directed graph by the heterogeneous set of computational nodes.

DETAILED DESCRIPTION

Figure 1:
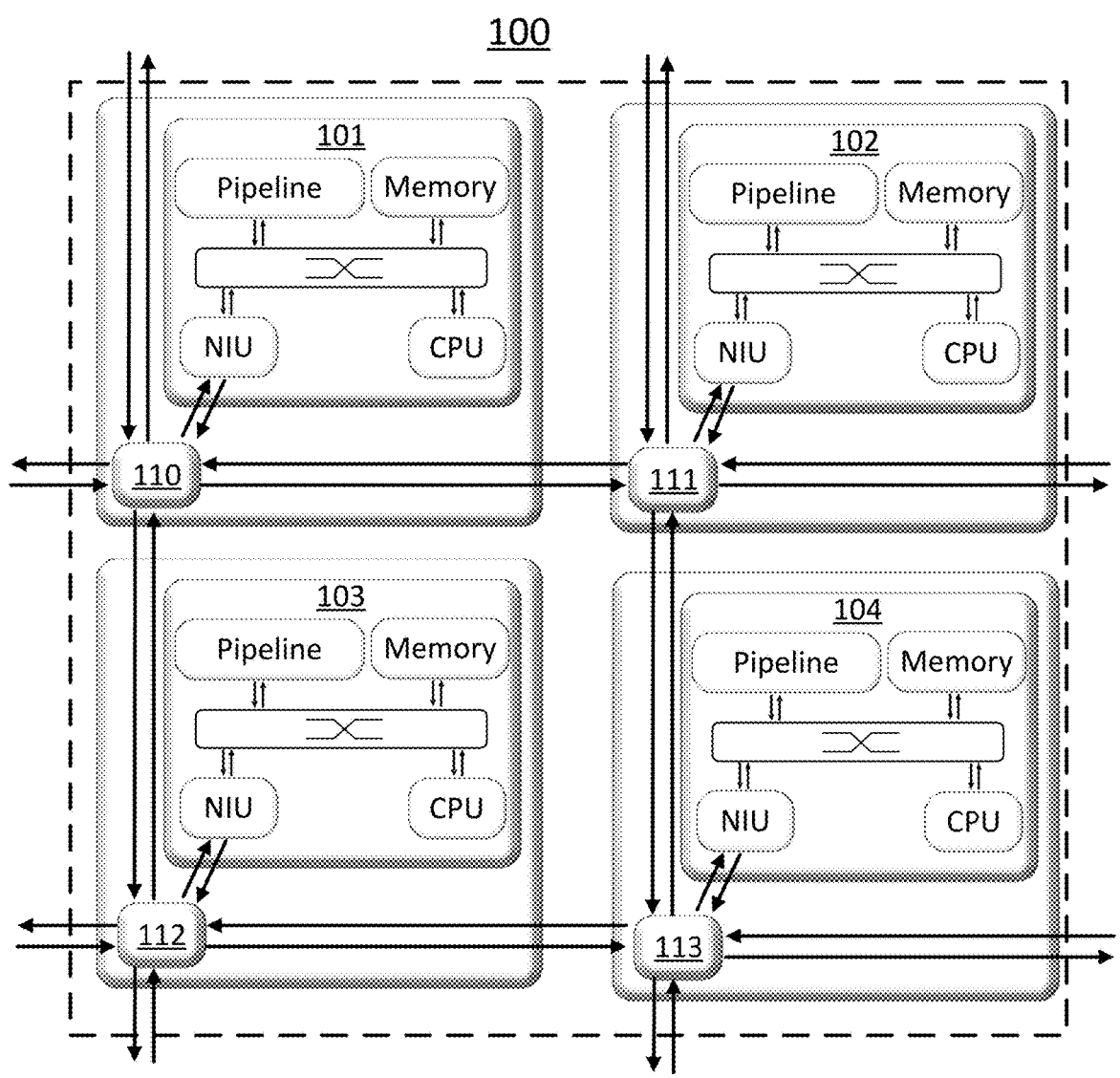
FIG. 1 includes both a block and layer diagram of a portion of a multicore processor connected by a network-on-chip (NoC) in accordance with the related art.

Methods and systems related to parallel computing using heterogeneous networks of computational nodes in accordance with the summary above are disclosed in detail herein. The methods and systems disclosed in this section are nonlimiting embodiments of the invention, are provided for explanatory purposes only, and should not be used to constrict the full scope of the invention. Although the specific examples provided in this section are directed to a network of computational nodes in the form of a NOC connecting a set of processing cores, specific embodiments disclosed herein are broadly applicable to any form of network connecting any form of computational nodes.

Networks in accordance with this disclosure can be implemented on a single chip system, including wafer-scale single chip systems, in a multichip single package system, or in a multichip multipackage system in which the chips are commonly attached to a common substrate such as a printed circuit board (PCB), interposer, or silicon mesh. Networks in accordance with this disclosure can also include chips on multiple substrates linked together by a higher-level common substrate such as in the case of multiple PCBs each with a set of chips where the multiple PCBs are fixed to a common backplane. Networks in accordance with this disclosure can also be implemented in chiplet based systems. For example, in specific embodiments of the invention, one or more computational nodes could be housed or implemented by one or more chiplets, connected, for example, through an interposer. Networks in accordance with this disclosure can further be implemented to link computational nodes on a single server, a set of servers in a cabinet rack, in a set of cabinet racks, in an entire data center, or a collection of networked data centers.

The computational nodes in accordance with this disclosure can cooperate in the execution of a complex computation by sharing data using the links of a network. The computational nodes can be processing cores such as individual processing cores in a multicore processor, individual processing units, processing cores of a graphics processing units, neural network accelerator processing units, processing cores of a cryptographic accelerator processing units, processing cores of a tensor processing unit, or any other processing unit or processor. An application data flow graph may be executed for the data involved with the complex computation to be distributed through the system. The application data flow graph can describe how data needs to flow through the system between the computational nodes for the complex computation to be executed. The points at which data can enter or exit the application data flow graph can be referred to as endpoints of the network. The endpoints can be associated with computational nodes. The endpoints can be any component of the system that requires data from the network or that administrates the transfer of data to a system on the network. In keeping with the example above of a multicore processor, the endpoints could be the processing pipelines of the processing cores, CPUs located on the processing cores, the core controllers, or any other functional block that needs access to data from the network.

In specific embodiments of the invention, dedicated hardware components can be used to efficiently execute an application data flow graph on a set of computational nodes. The dedicated hardware components can take the form of the specialized circuit blocks, such as the programmable controllers. The application data flow graph can be generated by the compiler disclosed herein and the instructions to implement the application data flow graph, as generated by the compiler, can be used to configure the programmable controllers. The instructions can be provided by higher-level controllers such as a core controller on a processing core. The instructions can be provided by a computation layer of the system. The programmable controllers can then independently and asynchronously execute the instructions independently of any higher-level controllers. The execution of the instructions can allow the programmable controllers to execute an application data flow graph for the computation layer of the system.

The complex computations disclosed herein can be the execution of a directed graph. The directed graph can be described using application code (e.g., a source code description of an algorithm). The directed graph can implement a machine learning algorithm such as an artificial neural network (ANN) or a support vector machine (SVM). The directed graph can also represent a hashing, encryption, decryption, or graphics rendering algorithm involving many component computations. In particular, the directed graph can implement algorithms requiring a high level of parallel processing such as a ray casting algorithm, cryptographic computations, recurrent neural networks, and others.

Figure 2:
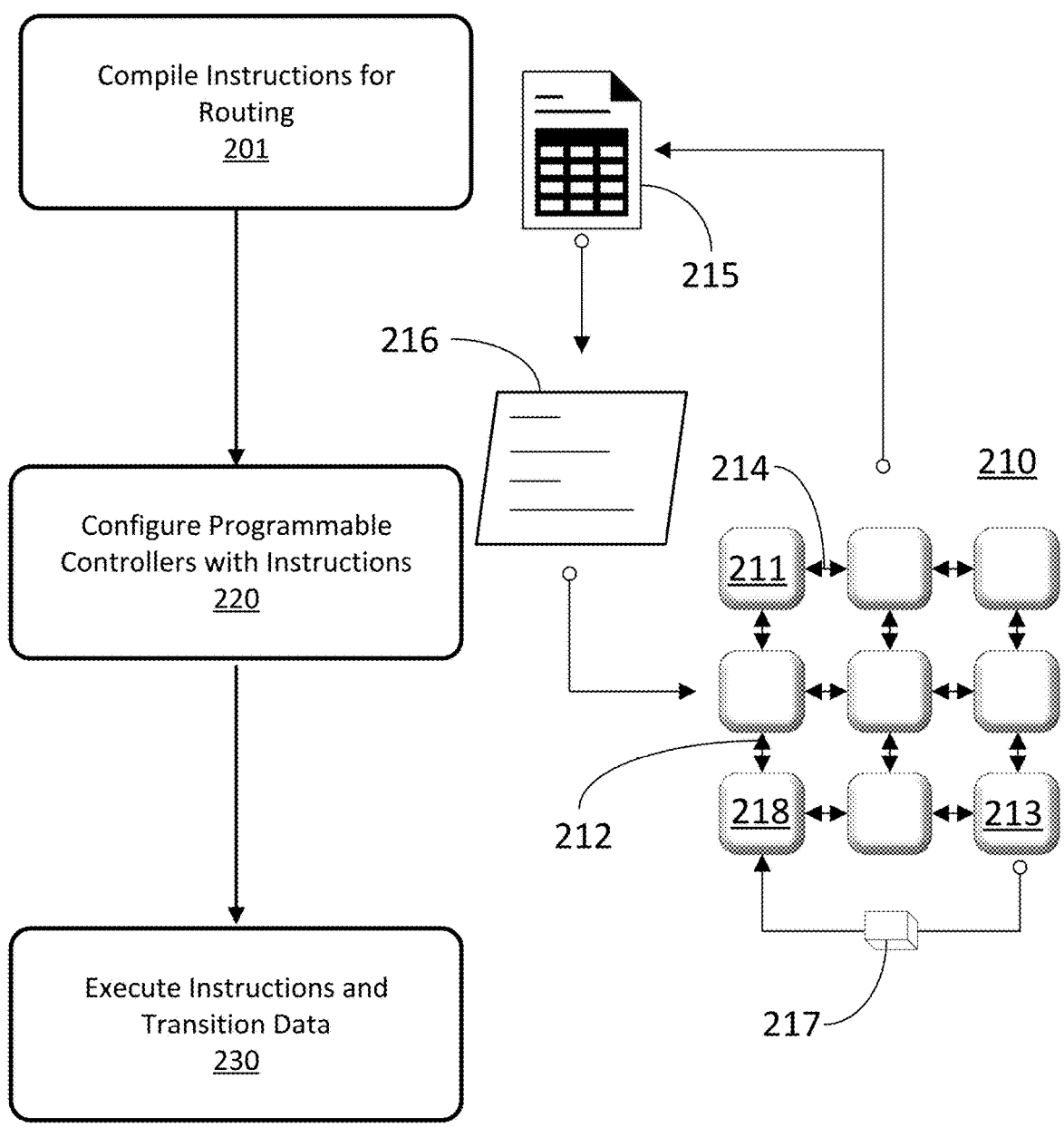
FIG. 2 includes a flow chart for a set of methods for executing a complex computation in accordance with specific embodiments of the invention disclosed herein.

FIG. 2 illustrates a flow chart 200 for a set of methods for executing a complex computation on a heterogeneous set of computational nodes linked together by a set of links in a network. The links in the network can be used to exchange data between the computational nodes to facilitate their combined execution of the complex computation. The network can be a network of processing cores such as network of processing cores 210 including individual processing cores such as processing core 211. The network can include a set of links such as link 212. The set of links can link the computational nodes in the network. The set of computational nodes can be a heterogeneous set of nodes in that the links between them cross different levels of a hardware hierarchy or otherwise are heterogeneous in terms of their bandwidth or latency. For example, the network of processing cores 210 could include a link 212 in the form of an intra-chip wired connection and another link 214 in the form of a server-to-server ethernet connection. In general, the links of a network for a heterogeneous set of computational nodes can be intra-chip wired connections, semiconductor package connections, PCB traces, silicon mesh wiring, interconnect fabric connections, PCI Express connections, or other computer system level connections, ethernet connections, or other computer system network level connections, and others. The set of computational nodes can alternatively or in combination be heterogeneous in that the individual computational nodes have different characteristics. For example, the network of processing cores 210 could include a processing core 211 in the form of a neural network accelerator and a processing core 213 in the form of a graphics processing unit. In general, the computational nodes of a heterogeneous set of nodes can be any type of computational node including graphics processing units, neural network accelerators, central processing units, tensor processing units, and others.

Flow chart 200 begins with a step 201 of compiling, using a table of bandwidth values for a set of links in a network, a set of instructions for routing data for the execution of the complex computation. The compiling can be conducted by a compiler. The set of instructions can be instructions for the network to route data between the computational nodes of the network such as instructions for executing an application data flow graph. The table of bandwidth values can be a data structure with a list of links in the network and an associated list of scalar values, or range of scalar values, for the bandwidth values for the associated links. The values could be provided in terms of bits or other data elements per unit time. The table could be derived from the network of computation nodes. As illustrated, table 215 is derived from network of processing cores 210. The table could be configured and made accessible to the compiler by the designer of the hardware of the network. In specific embodiments, the compiler could have a default program for exploring the topology and bandwidth of the various links of the network it was designed to provide instructions for. The table could also be a more complex data structure with more information regarding the links such as their latency values, peak frequency, quiescent and active state power consumption, and various other values.

In specific embodiments, step 201 can alternatively or in combination include compiling, using a machine model of the links of the network, the set of instructions for routing data for the execution of the complex computation. The machine model could be or include a model of the links of the network. The machine model could include a description of the topology and number of computational nodes in the network. The machine model could be or include a model of the computational nodes of the network. For example, the machine model could include an estimate of the operations per unit time that the computational nodes are able to execute. In specific embodiments, the machine model will include a table of bandwidth values and any of the additional values mentioned with respect to the tables in the prior paragraph. In embodiments where the computational nodes are homogenous, the simple machine model can solely include the information mentioned above. However, in embodiments where the computational nodes themselves are heterogeneous, the simple machine model can additionally include a table of the computational resources of the computational nodes in the heterogeneous network. The computational resources can include a computational speed such as a number of floating-point operations per second, a size of the main memory of the computational nodes, a size of the cache(s) of the computational nodes, and other high-level parameters that are indicative of the computational resources of the computational node.

Step 201 can be conducted using a compiler operating on a source code description of the complex computation. The compiler could automatically place and route the data for the component computations of the complex computation onto a given network using the description of the network provided by the tables or machine model described above. The instructions generated could include instructions for implementing an application data flow graph for the complex computation in a given network. The instructions could then be loaded into the network. As illustrated, instructions 216 are provided to network of processing cores 210 to allow the network of processing cores 210 to execute an application data flow graph for the complex computation. As the compiler is provided with data regarding the network and automatically places and routes the data for the component computations of a complex computation, the source code description of the complex computation can be written without concern for the idiosyncrasies of the network that will execute the complex computation.

The source language of the compiler and the target language of the compiler could take on various forms. The complex computation could be the execution of directed graph implementing a neural network and the source code description could be a PyTorch encoding of the neural network. The set of instructions for routing data for the execution of the complex computation could be one of the outputs of the compiler in the target language of the compiler. The target language could be machine code for the routing elements of the various computational nodes in the network of computational nodes. In implementations in which the heterogeneous network includes different types of computational nodes, or different types of links, the compiler could have multiple target languages which are specialized for each of the various nodes or links. However, in alternative embodiments, the network could be such that the different computational nodes and different links were compatible with a given networking standard, such as Ethernet, and the target language would be Ethernet router instructions. In implementations in which the routing technology of the various links and computational nodes was homogenous, the target language of the compiler could be instructions for that routing technology.

In the specific embodiments of the invention, the compiled instructions are instructions for the execution of a directed graph which is used to implement an ANN. In these embodiments, a compiler in accordance with specific embodiments of the invention can engage in automated model parallelism by slicing the tensors defined in the source code description of the ANN into packets that are used to route the data between the computational nodes of the network. The compiler can thereby assure that the computational nodes are used efficiently and are not overloaded by data structures that are not able to efficiently process on an individual basis. The compiler can also engage in automated pipeline parallelism by allowing the layers of the ANN to be scaled out and distributed to different computational nodes such that the layers can be executed in a pipelined fashion.

Flow chart 200 continues with a step 220 of configuring a set of programmable controllers on the heterogeneous set of computational nodes with the set of instructions. The instructions produced by the compiler in step 201 can be used to configure a set of programmable controllers which can execute the instructions to route data for the complex computation. The programmable controllers can execute the instructions asynchronously to the execution, by the computational nodes of the network, of the computations required for the execution of the complex computation. In specific embodiments, the application data flow graph can be efficiently executed using dedicated hardware components on the various computational nodes. The dedicated hardware components can include hardware subcomponents of varying degree of programmability, such as software-programmable general-purpose controllers or specialized programmable controllers. The programmable controllers on the various computational nodes can be configured using instructions provided to the controllers. The programmable controllers on the various computational nodes can then independently and asynchronously execute the instructions. These hardware subcomponents can each be configured to implement one transition of data in a set of transitions of data that combine to implement the data flow of the application data flow graph. The programmable controllers can be reconfigured using additional instructions to implement additional transfers of data during the execution of the application data flow graph. In specific embodiments, the programmable controllers can be native ethernet routers and be configured to route data for the execution of the complex computation using ethernet. In these embodiments, the computational nodes can include processing cores on multicore processors, where the multicore processors include integrated ethernet routers, so the multicore processor can communicate with other external computational nodes using ethernet, but without the need for an intermittent ethernet switch.

The programmable controllers can be configured in numerous ways. For example, the set of programmable controllers can be configured by a controller of a processing core, such as a CPU of each processing core. The programmable controllers can be configured to read from one or more specific addresses in the memory of the system. Configuration instructions can be pre-stored in the memory addresses or can be dynamically written by a different component of the system, such as a computation layer controller, such that the programmable controllers can read the configuration instructions from the memory address and configure themselves in accordance with such instructions. In embodiments in which the configuration instructions are dynamically generated by the system, the dedicated programmable controllers will be able to read such configurations and provide a highly configurable set of functionalities in accordance with the system needs and current status. The programmable controllers can be configured to continuously read instructions from memory as they execute their instructions and administrate the transfer of data in the network layer. The controller/CPU can control the location in memory where the instructions are being read to thereby control the configurations of the programmable controllers. The controller/CPU can induce the programmable controllers to start reading from another location in memory to change the configuration of the programmable controllers. The controller/CPU can also write the instructions themselves to thereby configure the programmable controllers. The controller/CPU can also, by writing different sets of instructions and/or by passing different addresses for the instructions to be read from to the programmable controllers, control a schedule of configurations for the dedicated hardware components to execute. In other words, the controller/CPU can cause a programmable controller to execute different portions of an application data flow graph at different times during the execution of that application data flow graph.

Flow chart 200 continues with a step 230 of executing the set of instructions using a set of programmable controllers and routing data through the network. The step can be conducted in accordance with the approaches described in the preceding paragraphs. The data can be routed through the network to facilitate the execution of a complex computation by the heterogeneous set of computational nodes and in response to the execution of the instructions. FIG. 2 illustrates data 217, in the form of a packet of data, being routed through the network from processing core 213 to processing core 218. The data routed through the network can be instructions for the execution of the complex computation or a set of neural network data such as inputs, activations, weights, filters, outputs, and other kinds of network data depending upon the time of neural network.

The programmable controllers could be associated with network interface units in the processing cores of a multi-core processor. The programmable controllers could be associated with network routers, such as ethernet routers. The ethernet routers could be integrated with a multicore processor in the network. The programmable controllers could be any of the programmable controllers described in U.S. patent application Ser. No. 16/902,035 filed Jun. 15, 2020, which is incorporated by reference herein in its entirety for all purposes, with the exception that the terms of this application are to be interpreted in light of their usage in this specification and not in light of their usage in the specification of the incorporated reference.

In specific embodiments of the invention, the networks can include a network hierarchy with various levels and with various computational nodes in each level. The network can include a network hierarchy with at least a core level and a chip level. The network can include a core level and a chip level as well as a server level and a rack level. The links in the network can include computer system level networking links such as ethernet links. The ethernet links can connect computational nodes in the same level of the hierarchy or can connect computational nodes across hierarchy levels. The computational nodes in each level may be able to communicate directly or may need to communicate through a higher level. For example, the heterogeneous set of computational nodes could include a set of processing cores in at least two multicore processors. The network would thereby by heterogeneous in that the links between processing cores on the individual multicore processors would likely be much faster than the links between the chips themselves. The processor cores in the multicore processor could then communicate directly while the processor cores on different levels would need to communicate via a communication through the chip level.

In specific embodiments of the invention, the computational nodes communicate across levels of the hierarchy and within levels of the network hierarchy in various ways. In specific embodiments of the invention, each computational node in a heterogeneous set of computational nodes includes a router from a set of routers. The routers can be distributed across the computational nodes in a one-to-one correspondence. The routers may be homogeneous or heterogeneous. In general, the routers in different levels of the hierarchy will be heterogeneous. For example, a processing core could include a router configured to communicate with a NOC while a multichip processor could include a router configured to communicate with an ethernet network. The routing of data through the network could include the set of homogeneous or heterogeneous routers transitioning data through multiple levels of the network hierarchy. In the previous example, this would include transitioning data through the core level and the chip level of the hierarchy.

In specific embodiments of the invention, the same compiler could generate instructions for the different types of routers, in a heterogeneous set of routers, to execute. In these embodiments, the compiler could have multiple target languages for generating the instructions for the different types of routers. The routers could include instructions to route data through the links of the network such as to route data through an ethernet link. However, the individual routers, such as routers on a processing core, may not need to know that the packet they are routing is destined for an ethernet link, as the router may only know that it needs to pass the packet to another location, and not need to know that it will then be routed from that location through the ethernet link.

In specific embodiments of the invention, the data could be routed through the network using packets, where the packets are identified using packet identifiers. The packets could include payloads and packet headers including an identifier for the packets. The routers of the network could route the packets using their instructions and the identifiers for the packets. In specific embodiments of the invention, the packets could be ethernet packets. In specific embodiments of the invention, different levels of the network hierarchy could be packet based using either the same or differing packet types. For example, the core level of the hierarchy could use proprietary NOC packets while the chip level of the hierarchy could use ethernet packets. However, the fact that both levels of the hierarchy used packets would be beneficial in that translating from one level to the next could be achieved simply by applying a wrapper to the underlying packets (with an optional step of gathering packets) as opposed to reformatting serial streaming data, or some other data format, into packets. In specific embodiments of the invention, packet routing can be conducted on the processing cores at the core level as described in U.S. patent application Ser. No. 17/035,046 filed Sep. 28, 2020, which is incorporated by reference herein in its entirety for all purposes, with the exception that the terms of this application are to be interpreted in light of their usage in this specification and not in light of their usage in that specification of the incorporated reference.

Figure 3:
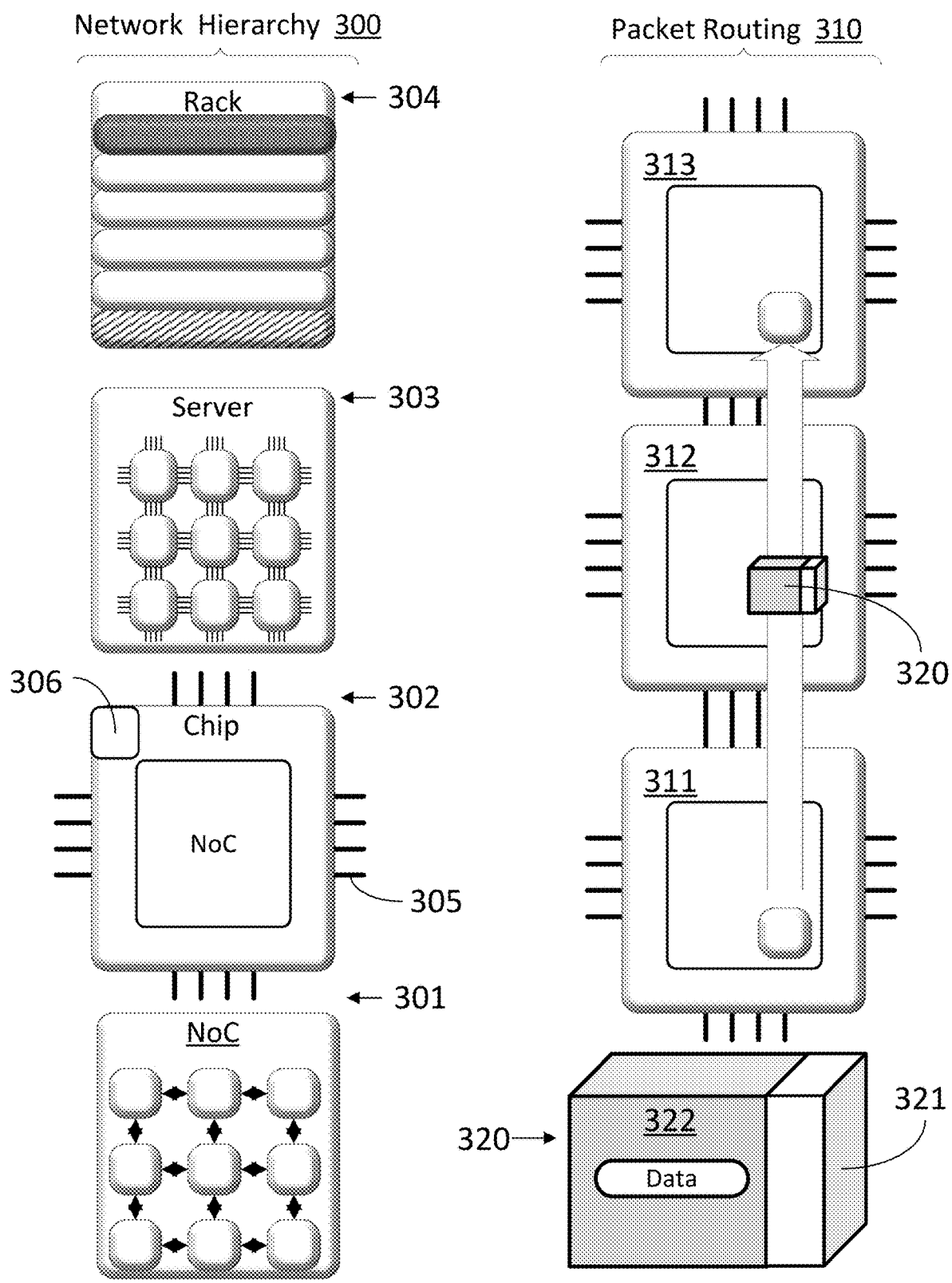
FIG. 3 includes a block diagram of a network hierarchy and packet routing flow chart in accordance with specific embodiments of the invention disclosed herein.

FIG. 3 is a block diagram of a network hierarchy 300 and a flow chart 310 to illustrate packet routing through network hierarchy 300 in accordance with specific embodiments of the invention disclosed herein. Network hierarchy 300 includes a core level 301 which is implemented by a NOC in the illustrated example. The core level 301 is a level of the hierarchy at which individual processing cores in the NOC communicate with each other. The cores can be, as illustrated, in the same NOC. However, as will be described with reference to packet routing in flow chart 310, the cores can also be on different NOCs such that they must communicate through a different layer of the hierarchy. Network hierarchy 300 also includes a chip level 302, a server level 303, and a rack level 304. Each of these levels is similar to the core level 301 in the sense that individual computational nodes on each layer may communicate directly or through a higher level of the hierarchy. For example, different chips on a single server may be able to communicate directly, while chips on different servers may need to communicate through server level 303. In the illustrated example, chip level 302 comprises a set of chips with 16 ethernet ports (e.g., ethernet port 305) used to communicate with other chips in the same server, or to communicate through the server level to chips on alternative servers. As illustrated, the chips on the chip level are also native ethernet devices as they include an integrated ethernet router 306.

Flow chart 310 illustrates how data can be routed through network hierarchy 300. As illustrated, the data passes from a processing core on chip 311, through chip 312, and on to a processing core on chip 313. As such, the data is transferred through the chip level of the network hierarchy. The instructions necessary to route the data could include instructions executed by the NOCs of chip 311 and 313. However, the transfer does not necessarily require any actions to be taken by the NOC of chip 312. In the illustrated case, each of the chips include integrated ethernet routers, such as integrated ethernet router 306. As such, chip 312 is simply a passthrough that receives the data and routes it on the chip level 302 but does not need to utilize any of the resources of the core level 301 on chip 312. Furthermore, in these embodiments the transfer of data does not require an external ethernet switch to route data on the chip, server, or rack level.

Flow chart 310 also illustrates the use of packets to route data through the network hierarchy. As illustrated, packet 320 includes a payload 322 and a packet header 321. The packet header could include a packet identifier for the packet. Flow chart 310 also shows packet 320 being routed through the chip level of the network hierarchy. As such, packet 320 is an ethernet packet. Accordingly, if the core level 301 is also packet based then the payload 322 of packet 320 may include the entire packet of the core level 301. Alternatively, packet 320 could be a packet routed by both the core layer and the chip level of the network hierarchy. In specific embodiments of the invention, the different levels of the network hierarchy can all conduct similar operations to simplify the operation of the compiler such as sharing a common library of primitives such as push, pop, copy, gather (N:1), scatter (1:N), shuffle N:N, and others. For example, the core level 301 and chip level 302 may operate on different types of packets but still conduct the same primitive operations on those packets.

Figure 4:
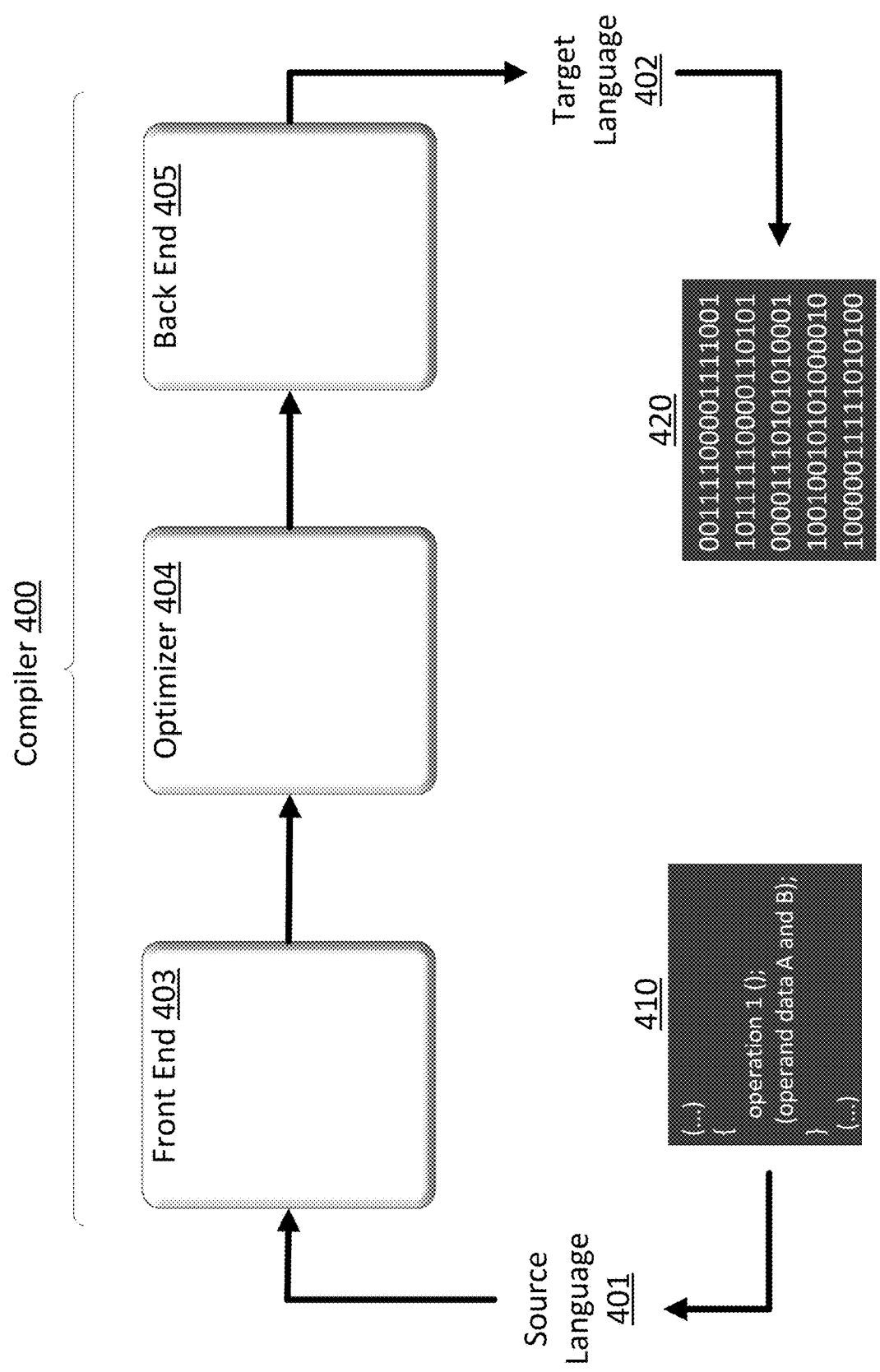
FIG. 4 includes a block diagram of a compiler architecture in accordance with specific embodiments of the invention disclosed herein.

FIG. 4 includes a block diagram of a compiler 400. The compiler generates a set of instructions 420 in a target language 402 of the compiler. The compiler generates the instructions using a source code description 410 of the complex computation. The source code description can be in a source language 401 of compiler 400. The front end 403 can translate the source language into a canonical description of the complex computation. The optimizer 404 can include information regarding the network such as the machine model described above and use it and the product of the front end 403 to generate an application data flow graph for the complex computation, or generally place and route the data and operations for the complex computation in the most efficient manner for executing the complex computation with a given network. The back end 405 can translate the application data flow graph into specific instructions for the various computational nodes, programmable controllers, or routers of the network to allow them to execute the complex computation and appropriately route data. For example, if certain levels of the hierarchy (e.g., the chip level and higher) used one type of router (e.g., ethernet routers controlled programmable controllers in the form of CPUs), and other levels of the hierarchy used another type of router (e.g., NOC routers controlled by dedicated network controllers) the compiler could have multiple target languages intended for the controllers of those different routers.

In specific embodiments of the invention, the software level of source code description 410 and front end 403 can see the network as a homogenous mesh of cores such that the source code description 410 does not need to include any information related to the network hierarchy of the network. Furthermore, while the source code description 410 may include a description of a set of processing cores that are intended to conduct specific operations in the complex computation, the set of cores identified in source code description 410 do not correlate with the set of computational nodes in the heterogeneous set of computational nodes that will execute the set of instructions 420 because optimizer 404 can engage in layer and model parallelism to break both data and operations down into smaller pieces that can be executed by a larger number of cores. In the same manner, if the network utilized computational nodes with greater resources than required by specific computational nodes identified in source code description 410, optimizer 404 may condense the operations of multiple processing cores in source code description 410 into a single computational node. Optimizer 404, with visibility into the bandwidth of the links of the network, can determine if the benefit of multiple cores being applied to a computation is outweighed by the drawback of having to route data between them based on how many levels of the network hierarchy must be traversed and the bandwidth of individual inks in the network.

Figure 5:
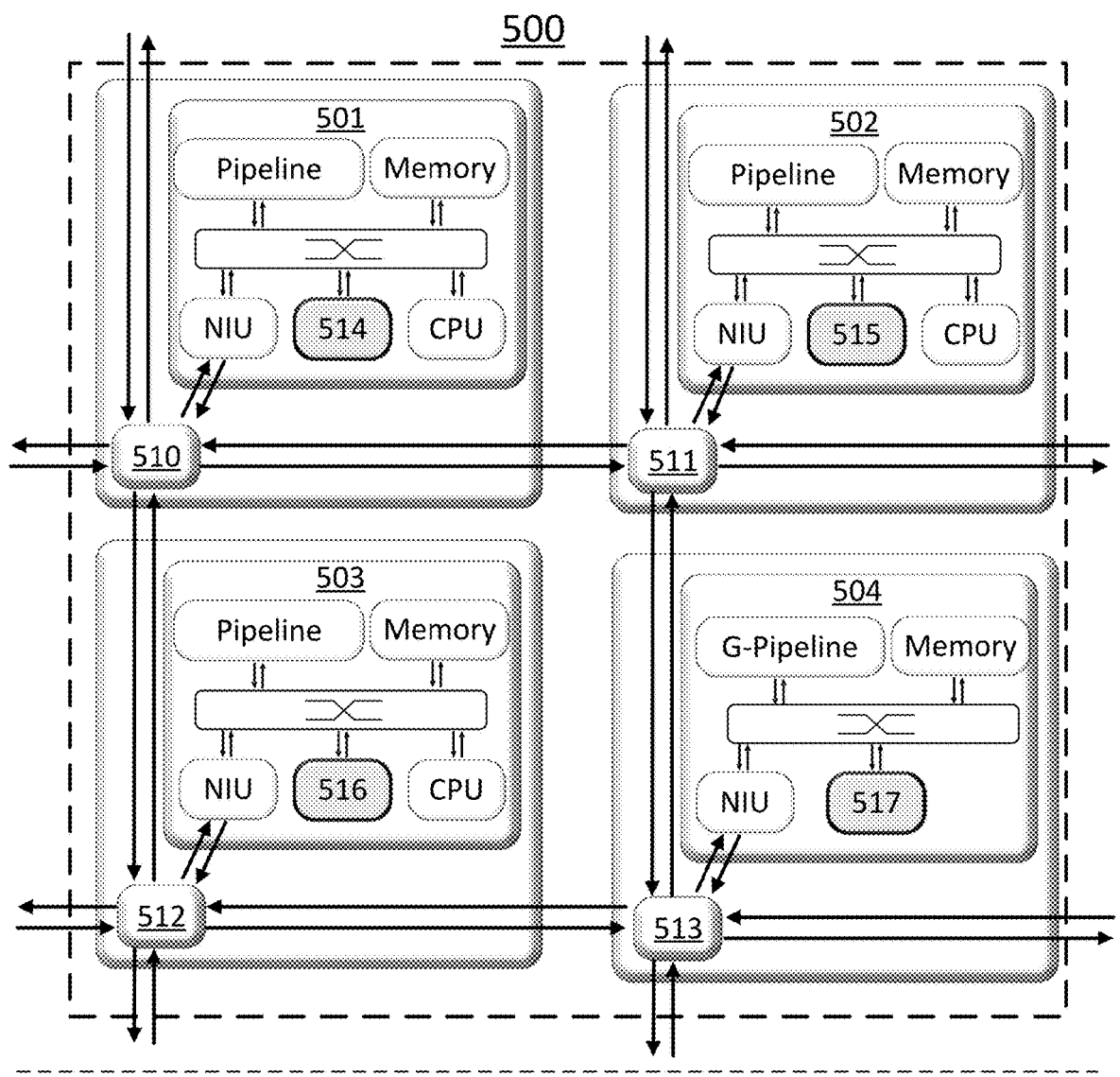
FIG. 5 includes a block diagram of a heterogeneous network of computational nodes in accordance with specific embodiments of the invention disclosed herein.

FIG. 5 illustrates a system for executing a complex computation in accordance with specific embodiments of the invention disclosed herein. The system includes a heterogeneous set of computational nodes 500. The set of computational nodes 500 include three neural network accelerator cores 501, 502, and 503, and a single graphics processing core 504. The cores are networked using a set of routers 510, 511, 512, and 513. The routers are connected by a set of links to form a network. The set of links link the computational nodes in the heterogeneous set of computational nodes 500. The system also includes a set of programmable controllers 514, 515, 516, and 517 on the set of computational nodes 500 that are configured with a set of instructions. The system also includes a compiler 520 configured to, using a table of bandwidth values for the set of links in the network, the set of instructions for routing data for the execution of the complex computation. The compiler can be integrated on the same chip as the illustrated set of heterogeneous computational nodes 500 or can be on a separate chip and be connected to the system using an external connection such as a PCI Express connection. The execution of the set of instructions using the set of programmable controllers 514, 515, 516, and 517 routes data through the network to facilitate the execution of the directed graph by the heterogeneous set of computational nodes. The set of programmable controllers utilize the NIUs and routers of their respective computational nodes to achieve this. In alternative embodiments that can be used in combination or in the alternative, the computational nodes could have included a graphics process unit in place of a single graphics processing core 504 and a neural network accelerator in place of cores 501, 502, and 503.

In specific embodiments of the invention, the disclosed network of computational nodes is in the form of a set of processing cores in a multicore processor connected by a NoC. The processing cores can each include a network interface unit (NIU) for interfacing with a router, a processing pipeline, and a memory. The memory could be a cache memory of the processing core such as a random-access volatile memory such as SRAM. The processing cores could also include additional or more specific elements such as a higher-level controller, serializer/de-serializer, nonvolatile memory for modifiable configuration information, and any number of arithmetic logic units and other fundamental computation units. The processing cores could also include one or more endpoints that can ultimately coordinate or execute operations within the core, such as a core controller. In specific embodiments, the core controller can be a dedicated Central Processing Unit (CPU). In either case, the core controller or CPU can administrate the transfer of data to a main processing pipeline of the processing core. The processing pipelines can be used to execute component computations required for the multicore processor to execute a complex computation. The NoC can include routers on each of the processing cores and a system of buses that either solely connect adjacent processing cores in the multicore processor for facilitating multi-hop communications or also connect distal processing cores for facilitating single-hop communications between those distal processing cores.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, the teachings disclosed herein should not be limited to a NOC connecting a network of processing cores as they can be applied to any network which operates to connect any set of computation units which are executing a complex computation. Furthermore, the disclosure should not be limited to any specific type of complex computation being executed on a multicore processor as the programming of and execution of any complex computation can be aided by specific embodiments disclosed herein including training or drawing an inference from an artificial neural network, or executing a hashing, encryption, decryption, or graphics rendering algorithm involving a large number of component computations. Furthermore, the examples of a network overlay layer isolating a computation layer from a network layer should not be interpreted to exclude systems which can be placed in a debugging mode, or similar mode of operation, in which the continuous execution of a complex computation is stalled, and the hardware or software otherwise associated with the computation layer can have a direct impact on the network layer without communicating with the network overlay layer. These and other modifications and variations to the present invention may be practiced by those skilled in the art, without departing from the scope of the present invention, which is more particularly set forth in the appended claims.

What is claimed is:

1. A method, for executing a complex computation on a heterogeneous set of computational nodes linked together by a set of links in a network, comprising:
    compiling, using a table of bandwidth values for the set of links in the network, a set of instructions for routing data for an execution of the complex computation;
    configuring a set of programmable controllers on the heterogeneous set of computational nodes with the set of instructions;
    executing the set of instructions using the set of programmable controllers; and
    routing the data: (i) through the network; (ii) to facilitate the execution of the complex computation by the heterogeneous set of computational nodes; and (iii) in response to the execution of the set of instructions;
    wherein: (i) the heterogeneous set of computational nodes includes a set of processing cores in at least two multicore processors; (ii) the network includes a network hierarchy with at least a core level and a chip level; (iii) each computational node in the heterogeneous set of computational nodes includes a router from a set of routers; (iv) the routing of the data through the network includes the set of routers transitioning the data through the core level and the chip level; (v) the network hierarchy includes a server level and a rack level; (vi) at least one of the links is an ethernet link; (vii) the routing of the data through the network includes the set of routers transiting the data through the server level and the rack level; and (viii) the ethernet link does not use an ethernet switch.

2. The method of claim 1, wherein:
    the complex computation is a directed graph;
    the directed graph implements a neural network; and
    the data routed through the network is a set of neural network data.

3. The method of claim 1, wherein:
    the set of instructions for routing data route the data using a set of packet identifiers for a set of packets;
    each computational node in the heterogeneous set of computational nodes includes a router from a set of routers; and
    the routers in the set of routers route the data using the set of packet identifiers.

4. The method of claim 3, wherein:
    the data is routed through the core level and the chip level using the set of packet identifiers.

5. The method of claim 3, wherein:
    at least one of the links in the set of links is an ethernet link between a first multicore processor chip and a second multicore processor chip; and
    a router in the set of routers routes the data through the ethernet link.

6. The method of claim 1, wherein:
    the compiling also uses a table of latency values for the set of links in the network.

7. The method of claim 1, wherein:
    the compiling of the set of instructions uses a source code description of the complex computation; and
    the source code description does not include any information related to the network hierarchy.

8. The method of claim 1, wherein:
    the compiling of the set of instructions uses a source code description of the complex computation; and
    a set of cores identified in the source code description do not correlate with a set of computational nodes in the heterogeneous set of computational nodes.

9. A method for executing a complex computation on a heterogeneous set of computational nodes linked together by a set of links in a network comprising:
    compiling, using a machine model of the set of links, a set of instructions for routing data for an execution of the complex computation, wherein the machine model includes a bandwidth for each link in the set of links in the network;
    configuring a set of programmable controllers on the heterogeneous set of computational nodes with the set of instructions;
    executing the set of instructions using the set of programmable controllers; and
    routing data: (i) through the network; (ii) to facilitate the execution of the complex computation by the heterogeneous set of computational nodes; and (iii) in response to the execution of the set of instructions;
    wherein: (i) the network includes a network hierarchy with at least a core level and a chip level; (ii) each computational node in the heterogeneous set of computational nodes includes a router from a set of routers; (iii) the routing of the data through the network includes the set of routers transitioning the data through the core level and the chip level; (iv) the network hierarchy includes a server level and a rack level; (v) at least one of the links is an ethernet link; (vi) the routing of the data through the network includes the set of routers transiting the data through the server level and the rack level; and (vii) the ethernet link does not require an ethernet switch.

10. The method of claim 9, wherein:
    the heterogeneous set of computational nodes includes a set of processing cores in at least two multicore processors.

11. The method of claim 9, wherein:
the machine model includes a table of latency values and a table of bandwidth values for the set of links in the network.

12. The method of claim 9, wherein:
the compiling of the set of instructions uses a source code description of the complex computation; and
the source code description does not include any information related to the network hierarchy.

13. The method of claim 9, wherein:
the compiling of the set of instructions uses a source code description of the complex computation; and
a set of cores identified in the source code description do not correlate with a set of computational nodes in the heterogeneous set of computational nodes.

14. The method of claim 9, wherein:
the set of instructions route the data using a set of packet identifiers for a set of packets;
each computational node in the heterogeneous set of computational nodes includes a router from a set of routers; and
the routers in the set of routers route the data using the set of packet identifiers.

15. The method of claim 14, wherein:
the data is routed through the core level and the chip level using the set of packet identifiers.

16. A system for executing a directed graph, comprising:
a heterogeneous set of computational nodes;
a set of links in a network, wherein the set of links link the computational nodes in the heterogeneous set of computational nodes;
a compiler configured to compile, using a table of bandwidth values for the set of links in the network, a set of instructions for routing data for an execution of the directed graph; and
a set of programmable controllers on the heterogeneous set of computational nodes configured with the set of instructions;
wherein executing the set of instructions route data through the network to facilitate the execution of the directed graph by the heterogeneous set of computational nodes; and
wherein: (i) the heterogeneous set of computational nodes includes a set of processing cores in at least two multicore processors; (ii) the network includes a network hierarchy with at least a core level and a chip level; (iii) each computational node in the heterogeneous set of computational nodes includes a router from a set of routers; (iv) the routing of the data through the network includes the set of routers transitioning the data through the core level and the chip level; (v) the network hierarchy includes a server level and a rack level; (vi) at least one of the links is an ethernet link; (vii) the routing of the data through the network includes the set of routers transiting the data through the server level and the rack level; and (viii) the ethernet link does not use an ethernet switch.

17. The system of claim 16, wherein:
the directed graph is a neural network; and
the heterogeneous set of computational nodes include a neural network accelerator and a graphics processing unit.

* * * * *

UNITED STATES PATENT AND TRADEMARK OFFICE
CERTIFICATE OF CORRECTION

| | |
|---|---|
| PATENT NO. | : 11,960,885 B2 |
| APPLICATION NO. | : 17/717769 |
| DATED | : April 16, 2024 |
| INVENTOR(S) | : Jasmina Vasiljevic |

It is certified that error appears in the above-identified patent and that said Letters Patent is hereby corrected as shown below:

On the Title Page

Item (54) and in the Specification Column 1 Lines 1-3, In Title:
Change "SEAMLESS PLACE AND ROUTE FOR HETEROGENOUS NETWORK OF PROCESSOR CORES"
To --SEAMLESS PLACE AND ROUTE FOR HETEROGENEOUS NETWORK OF PROCESSOR CORES--

Signed and Sealed this
Twelfth Day of November, 2024

Katherine Kelly Vidal
*Director of the United States Patent and Trademark Office*